United States Patent
Son

(10) Patent No.: US 12,097,490 B2
(45) Date of Patent: Sep. 24, 2024

(54) APPARATUS FOR ANALYZING SAMPLES INCLUDING A TEMPERATURE CONTROLLING MEMBER TO ADJUST BONDING FORCE OF A PIPETTE TIP

(71) Applicant: DNABOY CO., LTD., Gyeongju-si (KR)

(72) Inventor: Muntak Son, Gyeongju-si (KR)

(73) Assignee: DNABOY CO., LTD., Gyeongju-si (KR)

(*) Notice: Subject to any disclaimer, the term of this patent is extended or adjusted under 35 U.S.C. 154(b) by 369 days.

(21) Appl. No.: 17/595,925

(22) PCT Filed: May 26, 2021

(86) PCT No.: PCT/KR2021/006533
§ 371 (c)(1),
(2) Date: Nov. 29, 2021

(87) PCT Pub. No.: WO2021/241999
PCT Pub. Date: Dec. 2, 2021

(65) Prior Publication Data
US 2022/0226805 A1 Jul. 21, 2022

(30) Foreign Application Priority Data

May 28, 2020 (KR) .................. 10-2020-0064626

(51) Int. Cl.
*B01L 3/02* (2006.01)
*G01N 35/00* (2006.01)
*G01N 35/10* (2006.01)

(52) U.S. Cl.
CPC ........... *B01L 3/0237* (2013.01); *B01L 3/0275* (2013.01); *G01N 35/00623* (2013.01);
(Continued)

(58) Field of Classification Search
None
See application file for complete search history.

(56) References Cited

U.S. PATENT DOCUMENTS 8,383,421 B2 * 2/2013 Yanagida ............ B01L 3/50851
435/288.1
8,418,929 B2 * 4/2013 Tajima .................... B01L 3/021
422/50
(Continued)

FOREIGN PATENT DOCUMENTS

EP        2628786 A1    8/2013
JP    2002-043751 A    2/2002
(Continued)

OTHER PUBLICATIONS

International Search Report and Written Opinion mailed Aug. 26, 2021 in International Application No. PCT/KR2021/006533.
(Continued)

*Primary Examiner* — Peter J Macchiarolo
*Assistant Examiner* — Jermaine L Jenkins
(74) *Attorney, Agent, or Firm* — Knobbe, Martens, Olson & Bear, LLP

(57) ABSTRACT

This application relates to a sample analyzing apparatus. In one aspect, the apparatus includes a base, a connector arranged at an end of the base, and a temperature controlling member mounted on the base and configured to adjust a temperature of the connector. The apparatus may also include a controller configured to adjust heat generation of the temperature controlling member to adjust a bonding force of a pipette tip attached to a surface of the connector.

4 Claims, 7 Drawing Sheets

(52) U.S. Cl.
CPC .... *G01N 35/1009* (2013.01); *B01L 2200/023* (2013.01); *B01L 2200/028* (2013.01); *B01L 2200/147* (2013.01); *B01L 2300/18* (2013.01)

(56) References Cited

U.S. PATENT DOCUMENTS

| | | | |
|---|---|---|---|
| 9,797,008 B2 * | 10/2017 | Tajima | G01N 35/04 |
| 11,573,243 B2 * | 2/2023 | Fujii | B01L 3/021 |
| 2021/0116470 A1 * | 4/2021 | Nakayama | G01N 35/04 |

FOREIGN PATENT DOCUMENTS

| | | |
|---|---|---|
| JP | 2008-018960 A | 1/2008 |
| KR | 10-2013-0039125 A | 4/2013 |
| KR | 10-2013-0092185 A | 8/2013 |
| KR | 10-2019-0053822 A | 5/2019 |

OTHER PUBLICATIONS

Extended European Search Report mailed Feb. 10, 2024 in European Application No. 21809894.5, in 8 pages.

* cited by examiner

APPARATUS FOR ANALYZING SAMPLES INCLUDING A TEMPERATURE CONTROLLING MEMBER TO ADJUST BONDING FORCE OF A PIPETTE TIP

The present application is a U.S. national phase application under 35 U.S.C. § 371 of International Application No. PCT/KR2021/006533, filed on May 26, 2021, which claims the benefit of Korean Patent Application No. 10-2020-0064626 filed on May 28, 2020 in the Korean Intellectual Property Office, the entire disclosure of each of which is incorporated herein by reference.

TECHNICAL FIELD

The present disclosure relates to a sample analyzing apparatus and method for easily and quickly mounting and detaching a pipette tip.

RELATED ART

In biochemistry experiments, a pipetting instrument is used to dispense a liquid. Micropipettes were developed in 1957 in Germany and have since been used as a means for conveniently transporting or dispensing a liquid in biochemistry experiments.

In general, a pipetting instrument is used to transport a liquid sample having an accurately measured volume. A pipetting instrument includes a pipette body having a hollow and cylindrical shape and a piston movably installed in an axial direction in the pipette body. The pipetting instrument first moves the piston downward inside the pipette body by a certain distance and then moves the piston upward again so that a liquid sample is sucked into a tip inserted in a lower end of the pipette. Next, the pipetting instrument is moved to a desired position and the piston is moved downward again, thereby distributing the sucked liquid sample to the outside.

For pipetting, the pipette tip is to be inserted in the lower end of the pipette body. According to the related art, the lower end of the pipette body or the pipette tip is elastically deformed to couple the pipette device. However, since a relatively large force is needed to elastically deform the pipette body or the pipette tip, an additional assembly equipment to couple the pipette tip is required.

In addition, the pipette tip needs to have an elastic restoring force that provides durability to endure a large force applied during assembly, and to receive a force, a portion of the pipette tip to be coupled needs to be relatively long to some extent. As the pipette tip needs to have a certain length or volume, there is a limitation on storage or usability of the pipette tip.

DETAILED DESCRIPTION OF THE INVENTION

Technical Object

The objective of the present disclosure is to provide a sample analyzing apparatus and a sample analyzing method, whereby a pipette tip may be easily mounted and detached by controlling a temperature. However, the objective is an example, and the scope of the present disclosure is not limited thereby.

Technical Solution

According to an aspect of the present disclosure, there is provided a sample analyzing apparatus including: a base; a connector arranged at an end of the base; a temperature controlling member mounted on the base and configured to adjust a temperature of the connector; and a controller configured to adjust heat generation of the temperature controlling member to adjust a bonding force of a pipette tip attached to a surface of the connector.

Effect of the Invention

According to a sample analyzing apparatus and a sample analyzing method, according to an embodiment of the present disclosure, a pipette tip may be easily and quickly attached and detached. The pipette tip may be formed of a polymer having a relatively low melting temperature, and by controlling a temperature of a connector that contacts the pipette tip, the pipette tip may be attached to or detached from the sample analyzing apparatus. As the controller sets a temperature of the connector to a melting point or higher, the pipette tip is easily attached to the connector. Next, when the controller lowers the temperature of the connector, a bonding force between the connector and the pipette tip is reduced, and thus, the pipette tip may be removed easily and neatly.

According to the sample analyzing apparatus and the sample analyzing method, according to an embodiment of the present disclosure, an inspection fluid may be stably sucked in and ejected. Even when the temperature of the connector is lowered, the bonding force between the pipette tip and the connector is set to a certain level or higher, and thus, despite a positive or negative pressure formed in the pipette tip, sealing may be maintained and thus stable pipetting may be performed. However, the scope of the present disclosure is not limited by the above-described effects.

BEST MODE OF THE INVENTION

Figure 1:
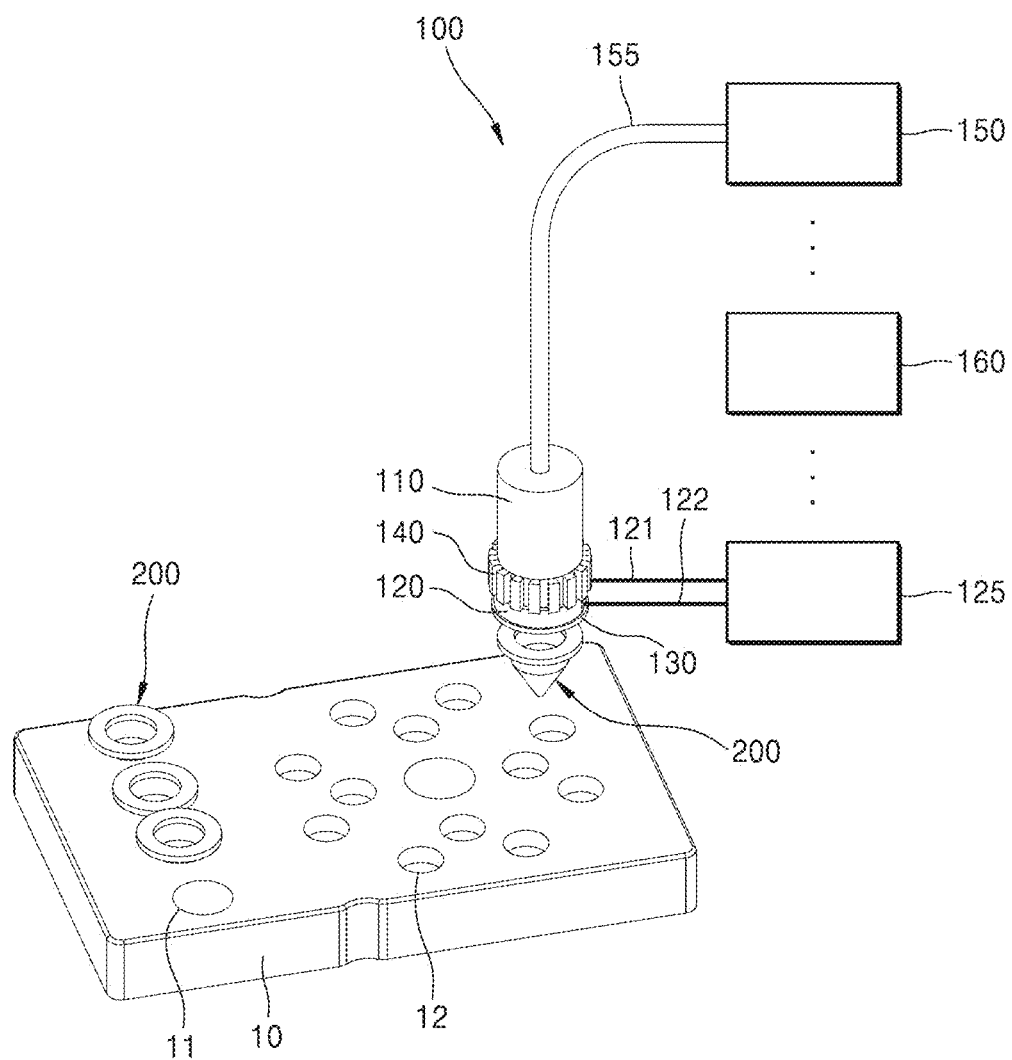
FIG. 1 is a perspective view illustrating a sample analyzing apparatus and a cartridge, according to an embodiment of the present disclosure.

According to an aspect of the present disclosure, there is provided a sample analyzing apparatus including: a base; a connector arranged at an end of the base; a temperature controlling member mounted on the base and configured to adjust a temperature of the connector; and a controller configured to adjust heat generation of the temperature controlling member to adjust a bonding force of a pipette tip attached to a surface of the connector.

The temperature controlling member may increase the temperature of the connector to a preset first temperature or higher to attach the pipette tip to the connector, and lower the temperature of the connector to a preset second temperature which is lower than the first temperature to separate the pipette tip from the connector.

The sample analyzing apparatus may further include a driving unit connected to the base and configured to form a positive or negative pressure in the pipette tip when the temperature controlling member sets the connector to a temperature between the first temperature and the second temperature.

The pipette tip may include a low melting point polymer including at least one of polycaprolactone (PLC), polytetramethylene oxide (PMTO), and polyethylene oxide (PEG).

The pipette tip may include polycaprolactone (PLC).

The temperature controlling member may lower a temperature as a polarity of electricity applied by the controller is converted.

In addition to the aforesaid details, other aspects, features, and advantages will be clear from the detailed description, claims, and drawings below.

MODE FOR CARRYING OUT THE INVENTION

Hereinafter, various embodiments of the present disclosure are described in association with the attached drawings. As the present disclosure allows for various changes and numerous embodiments, particular embodiments will be illustrated in the drawings and described in detail in the written description. However, this is not intended to limit the present disclosure to particular modes of practice, and it is to be appreciated that all changes and/or equivalents or substitutes that do not depart from the spirit and technical scope of the present disclosure are encompassed in the present disclosure. Like reference numerals in the description of the drawings denote like elements.

The terms used in the present disclosure are merely used to describe particular embodiments, and are not intended to limit the various embodiments of the present disclosure. The singular forms include the plural forms unless the context clearly indicates otherwise.

Unless defined differently, all terms used in the description including technical and scientific terms have the same meaning as generally understood by those skilled in the art to which the various embodiments of the present disclosure pertains.

Terms as defined in a commonly used dictionary should be construed as having the same meaning as in an associated technical context, and unless defined apparently in the various embodiments of the present disclosure, the terms are not ideally or excessively construed as having formal meaning.

Figure 2:
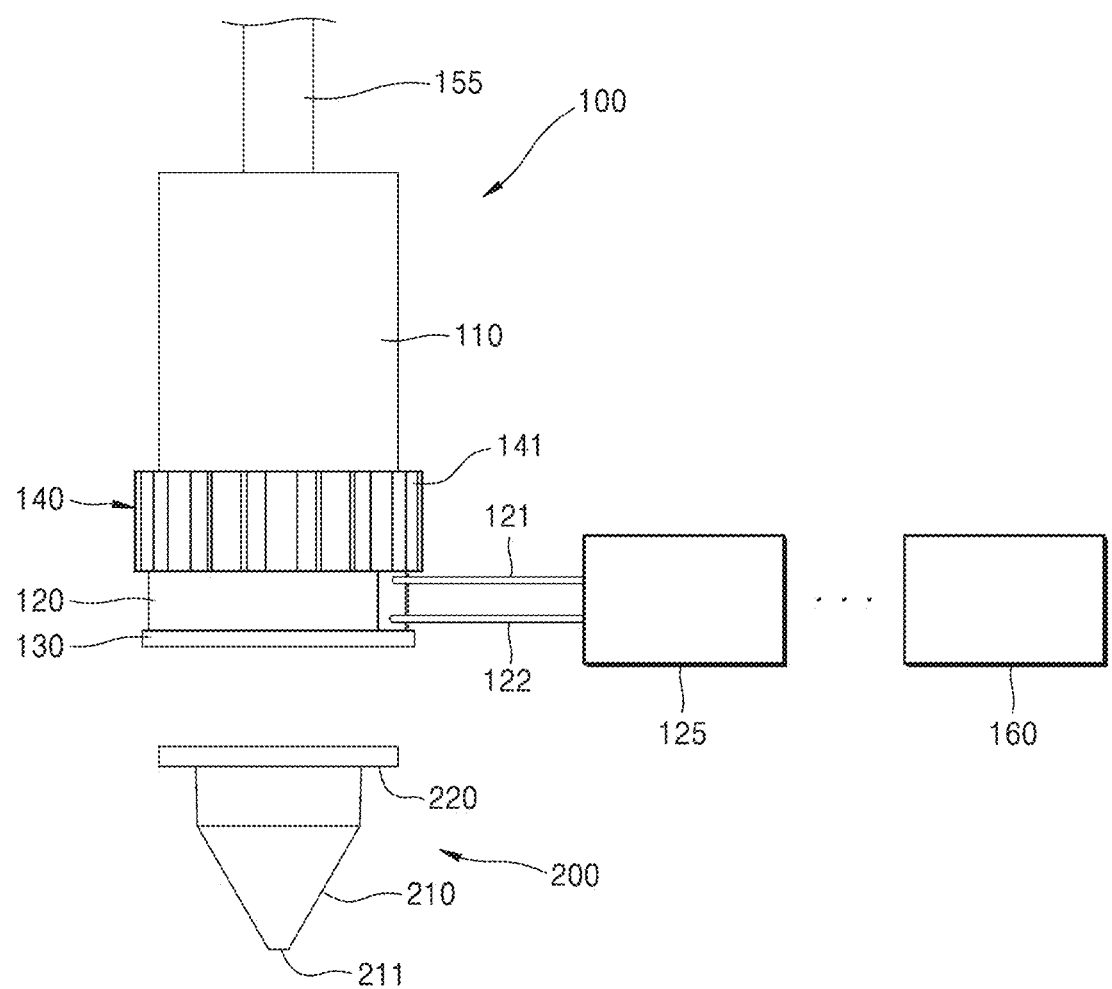
FIG. 2 illustrates the sample analyzing apparatus of FIG. 1.

FIG. 1 is a perspective view illustrating a sample analyzing apparatus 100 and a cartridge 10, according to an embodiment of the present disclosure. FIG. 2 illustrates the sample analyzing apparatus 100 of FIG. 1.

Referring to FIGS. 1 and 2, the sample analyzing apparatus 100 may collect a sample or specimen which is an analysis object and perform various analyses such as chemical analysis, gene analysis, or immunity analysis. For example, the sample analyzing apparatus 100 may suck in or discharge an inspection liquid from the cartridge 10 through a pipette tip 200 to conduct an analysis.

The cartridge 10 may store the pipette tip 200, and collect a sample by using the pipette tip 200. A plurality of pipette tips 200 are arranged in storage grooves 11 in one side of the cartridge 10. As the cartridge 10 and the pipette tip 200 are configured as a single set, in order to collect a sample or a sample, a user may immediately collect and analyze a specimen by attach the pipette tip 200 to the sample analyzing apparatus 100.

A plurality of collection grooves 12 may be arranged in the other side of the cartridge 10. When an inspection fluid is injected into the collection grooves 12, the user may attach the pipette tip 200 to the sample analyzing apparatus 100 and collect the inspection fluid.

For pipetting, the cartridge 10 may be opened, and the sample analyzing apparatus 100 and the pipette tip 200 are bonded to each other as described below. An inspection fluid to be pipetted is stored in the collection grooves 12, and as the sample analyzing apparatus 100 adjusts a pneumatic pressure, the inspection fluid may be sucked in or discharged using the pipette tip 200.

The sample analyzing apparatus 100, to which the pipette tip 200 is mounted, may include a base 110, a temperature controlling member 120, a connector 130, a heat dissipation member 140, a driving unit 150, and a controller 160.

The sample analyzing apparatus 100 may include the pipette tip 200 that is selectively attached to the connector 130. For example, according to an embodiment, as illustrated in FIG. 1, the pipette tip 200 may be configured as a set with the cartridge 10 in the cartridge 10, and the sample analyzing apparatus 100 may be included separately from the cartridge 10, and when the sample analyzing apparatus 100 is used for sample analysis, the pipette tip 200 may be attached to the sample analyzing apparatus 100. According to another embodiment, the sample analyzing apparatus 100 may be configured as a set including the pipette tip 200. However, for convenience of description, an embodiment in which the pipette tip 200 is separately included in the cartridge 10 will be described below.

The base 110 forms the exterior of the sample analyzing apparatus 100, and may have therein a passage through which a fluid moves. The controller 160 may be mounted in the base 110 to control the sample analyzing apparatus 100. While an embodiment in which the base 110 has a cylindrical shape is illustrated, the base 110 is not limited thereto and may have various shapes.

A channel (not shown) through which a gas may move may be arranged in the base 110. The channel may be connected to the driving unit 150 via a tube 155 to form a positive or negative pressure in the pipette tip 200.

One end of the channel is connected to the tube 155 of the driving unit 150, and the other end thereof is connected to the pipette tip 200. As the driving unit 150 is driven to suck in a gas from the base 110, a negative pressure may be formed in the pipette tip 200 such that the pipette tip 200 sucks in an inspection fluid. In addition, when the driving unit 150 is driven and gas is discharged to the base 110, a positive pressure may be formed in the pipette tip 200 and an inspection fluid may be discharged from the pipette tip 200.

The temperature controlling member 120 may be mounted on the base 110 and adjust a temperature of the connector 130. The temperature controlling member 120 may be arranged between the connector 130 and the base 110, and heat generated in the temperature controlling member 120 may be transferred to the connector 130. In addition, the temperature controlling member 120 may cool the connector 130.

The temperature controlling member 120 may be configured with various components that are heated and cooled. For example, the temperature controlling member 120 may increase or decrease a temperature of the connector 130 by using electricity. In addition, the temperature controlling member 120 may increase or decrease a temperature of the connector 130 by using a heat transfer medium.

According to an embodiment, the temperature controlling member 120 may include a thermoelectric element, and may control a temperature by an electrical signal applied by the controller 160. When direct current power is applied to the temperature controlling member 120, the temperature controlling member 120 may be heated, and the temperature of the connector 130 may be increased, accordingly.

In an embodiment, when a supply direction of a direct current power supply 125 applied to the temperature controlling member 120 is changed, the temperature controlling member 120 may be cooled to lower the temperature of the connector 130. In the temperature controlling member 120, which is a thermoelectric element, a polarity of direct current power may be adjusted by the controller 160 to increase or decrease the temperature of the connector 130.

The temperature controlling member 120 is electrically connected to the direct current power supply 125 by a first wire 121 and a second wire 122. When a signal for increasing the temperature of the connector 130 is applied by the controller 160, the direct current power supply 125 forms a circuit in which a current is supplied from the first wire 121 to the temperature controlling member 120 and then the current returns to the second wire 122. On the other hand, when a signal for lowering the temperature of the connector 130 is applied by the controller 160, the direct current power supply 125 forms a circuit in which a current is supplied from the second wire 122 to the temperature controlling member 120 and the current returns to the first wire 121.

In another embodiment, the temperature controlling member 120 may include a heating part (not shown) and a cooling part (not shown). The heating part and the cooling part are not limited to specific parts, and may be defined as a configuration having a heating function and a configuration having a cooling function, respectively. In order to increase the temperature of the connector 130, the controller 160 may drive the heating part of the temperature controlling member 120, and in order to decrease the temperature of the connector 130, the controller 160 may drive the cooling part of the temperature controlling member 120.

The connector 130 may be arranged at an end of the base 110, and the pipette tip 200 may be attached thereto. The connector 130 may contact the temperature controlling member 120, and when the temperature controlling member 120 is heated, the temperature of the connector 130 is increased, and when the temperature controlling member 120 is cooled, the temperature of the connector 130 is lowered.

The connector 130 may be formed of a material having a high thermal conductivity, and for example, the connector 130 may be formed of a metal or an alloy.

As one surface of the connector 130 is in contact with the temperature controlling member 120 and the other surface thereof is in contact with the pipette tip 200, a thickness of the connector 130 is set to be thin in order to increase a heat transfer speed. For example, the thickness of the connector 130 may be set to be smaller than a thickness of the temperature controlling member 120, and may be set to be smaller than a thickness of the heat dissipation member 140.

The connector 130 may be detachably assembled to the temperature controlling member 120. When a foreign material is adhered to a surface of the connector 130 after using the sample analyzing apparatus 100 a plurality of times, the connector 130 may be replaced.

The connector 130 may contact a flange end 220 of the pipette tip 200 and may be set to correspond to a shape of the flange end 220. As illustrated in the drawing, the flange end 220 may have an annular shape, and the connector 130 may also have an annular shape to correspond to the shape of the flange end 220.

The connector 130 may be set to have a diameter d1 greater than a diameter d2 of the temperature controlling member 120. The connector 130 may be set to completely cover the temperature controlling member 120, and thus, heat generated in the temperature controlling member 120 may be completely transferred to the connector 130.

The diameter d1 of the connector 130 may be set to be greater than a diameter d3 of the pipette tip 200. When attaching the pipette tip 200, the sample analyzing apparatus 100 may move the base 110 such that the connector 130 is aligned above the flange end 220. By setting a slightly larger size of the connector 130 than the flange end 220, the pipette tip 200 may be attached to the sample analyzing apparatus 100 even when the sample analyzing apparatus 100 does not accurately align the pipette tip 200.

The heat dissipation member 140 may be arranged between the temperature controlling member 120 and the base 110 to prevent transfer of heat generated in the temperature controlling member 120, to the base 110. The heat dissipation member 140 may be formed of a material having a heat dissipation function, and may have a heat dissipation protrusion 141.

A plurality of heat dissipation protrusions 141 are arranged on an outer portion of the heat dissipation member 140 and are spaced apart from each other at preset distances. The heat dissipation protrusions 141 may increase a surface area of the heat dissipation member 140 to increase heat dissipation efficiency.

The driving unit 150 may be connected to the base 110, and when driven, may generate a positive or negative pressure in the pipette tip 200. The driving unit 150 may include a pump for sucking or discharging air to or from the tube 155, and may be driven by a driving signal of the controller 160. According to another embodiment, the driving unit 150 may include a syringe unit (not shown) and move a piston to form a positive or negative pressure in the pipette tip 200.

The driving unit 150 is driven by the controller 160, and when the temperature of the connector 130 is set to a third temperature T3 which is a temperature between the first temperature T1 and the second temperature T2, the driving unit 150 may receive a driving signal from the controller 160. That is, the driving unit 150 has a bonding force that is sufficient to maintain a state in which the pipette tip 200 is attached to the connector 130, and at the same time, the driving unit 150 is driven only after the connector 130 is set to the third temperature T3 at which sealing between the pipette tip 200 and the connector 130 is maintained, and sucks in or discharges an inspection fluid through the pipette tip 200.

The controller 160 may adjust heat generation and/or cooling of the temperature controlling member 120 to adjust a bonding force of the pipette tip 200 attached to a surface of the connector 130. The controller 160 may set a surface temperature of the connector 130 by controlling an amount of heat generation or an amount of cooling of the temperature controlling member 120.

To set the temperature of the connector 130 to the first temperature T1, which is a melting temperature of the pipette tip 200, the controller 160 may apply a driving signal of the temperature controlling member 120. The controller 160 may control an amount of heat generation or a time of heat generation of the temperature controlling member 120 or the like such to the connector 130 to the first temperature T1 and maintain the temperature.

To separate the pipette tip 200, the controller 160 may lower the temperature of the connector 130 to the second temperature T2. When the temperature of the connector 130 is changed to the second temperature T2 by the controller 160, the bonding force of the pipette tip 200 is reduced. The user may use another instrument or apply an external force directly to the pipette tip 200 to remove the pipette tip 200 from the connector 130.

According to another embodiment, after setting the temperature of the connector 130 to the second temperature (T2), the controller 160 may drive the driving unit 150 and remove the pipette tip 200 from the connector 130. When the driving unit 150 forms a positive or negative pressure in the pipette tip 200, cracks may increase in a bonding portion between the flange end 220 and the connector 130, thereby separating the pipette tip 200 from the connector 130.

The controller 160 may heat or cool the connector 130 by adjusting a polarity of electricity applied to the temperature controlling member 120. To increase the temperature of the connector 130, the controller 160 applies direct current power in one direction to thereby cause heat generation from the temperature controlling member 120. To lower the temperature of the connector 130, the connector 130 may convert the direction of the direct current power and apply the direct current power, and the temperature controlling member 120 absorbs heat from the connector 130, accordingly.

The controller 160 may include a processor (not shown) to control the sample analyzing apparatus 100 overall. In detail, the processor controls overall operations of the sample analyzing apparatus 100. For example, the processor may include a CPU, RAM, and/or ROM. Here, ROM is a configuration in which a command set for system booting is stored, and the CPU copies an operating system stored in a memory of a sample analyzing apparatus to the RAM according to commands stored in the ROM, and executes O/S to boot a system. When booting is completed, the CPU may copy various applications stored in a storage unit to RAM and execute the applications to perform various operations. While it has been described above that the sample analyzing apparatus 100 includes only one CPU, it may be implemented with a plurality of CPUs (or DSPs, SoCs, etc.).

According to an embodiment of the present disclosure, the processor may be implemented as a digital signal processor (DSP) for processing a digital signal, a microprocessor, or a time controller (TCON) I. However, the processor is not limited thereto, and may include one or more of a central processing unit (CPU), a micro controller unit (MCU), a micro processing unit (MPU), a controller, an application processor (AP), or a communication processor (CP), an ARM processor, or may be defined by corresponding terms. In addition, the processor may be implemented as a system on chip (SoC) having a built-in processing algorithm, large scale integration (LSI), or a field programmable gate array (FPGA).

The sample analyzing apparatus may include a storage unit (not shown) storing a program for processing or controlling the processor and/or various data for operation of the program. The storage unit may store a plurality of application programs (or applications) driven by the sample analyzing apparatus, data for operation of the sample analyzing apparatus, and instructions. At least some of these application programs may be downloaded from an external server and/or a cloud through wireless communication. In addition, at least some of these application programs may exist on the sample analyzing apparatus from the time of shipment for basic functions of the sample analyzing apparatus. The application programs may be stored in a storage medium and driven by a processor to perform an operation (or function) of the sample analyzing apparatus. In addition, the storage unit may include a DB storing data regarding a set temperature according to a material of the pipette tip 200. Data stored in the DB may be input by the user, but is not limited thereto, and may be transmitted through an external server or cloud (not shown) and/or an external terminal (not shown).

To this end, the controller 160 may further include a communication unit (not shown) to transmit and receive data, and the communication unit may include a short range communication unit such as a Bluetooth communication unit, a Bluetooth Low Energy (BLE) communication unit, a Near Field Communication unit, and a WLAN (Wi-Fi) communication unit, a Zigbee communication unit, an infrared Data Association (IrDA) communication unit, a WFD (Wi-Fi Direct) communication unit, a UWB (ultra wideband) communication unit, an Ant+ communication unit, or the like, a mobile communication network.

Hereinafter, the first temperature T1 is defined as a temperature higher than the melting temperature of the pipette tip 200. The second temperature T2 is lower than the first temperature T1, and is defined as a temperature at which the pipette tip 200 may be separated as the bonding force between the pipette tip 200 and the connector 130 is reduced. The third temperature T3 is a temperature between the first temperature T1 and the second temperature T2, and is defined as a temperature at which sealing between the pipette tip 200 and the connector 130 is maintained and the pipette tip 200 has a significant bonding force with respect to the connector 130 when a positive or negative pressure is generated in the pipette tip 200.

Figure 3:
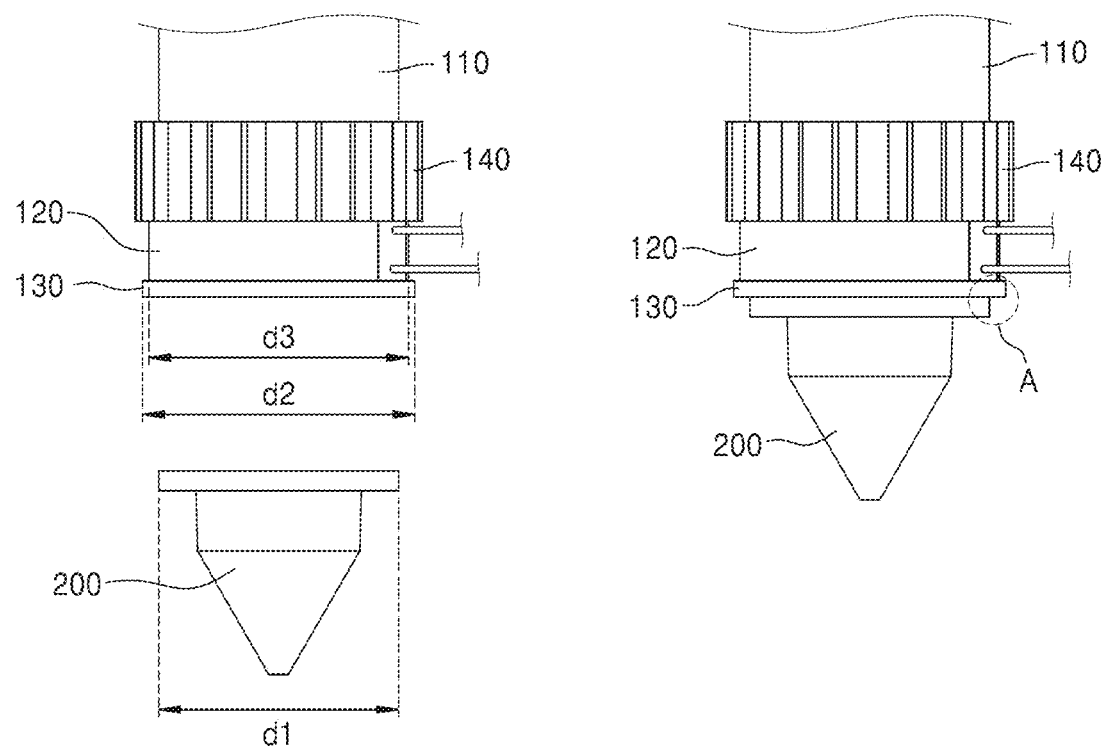
FIG. 3 illustrates a sample analyzing apparatus to which a pipette tip is attached.
Figure 4:
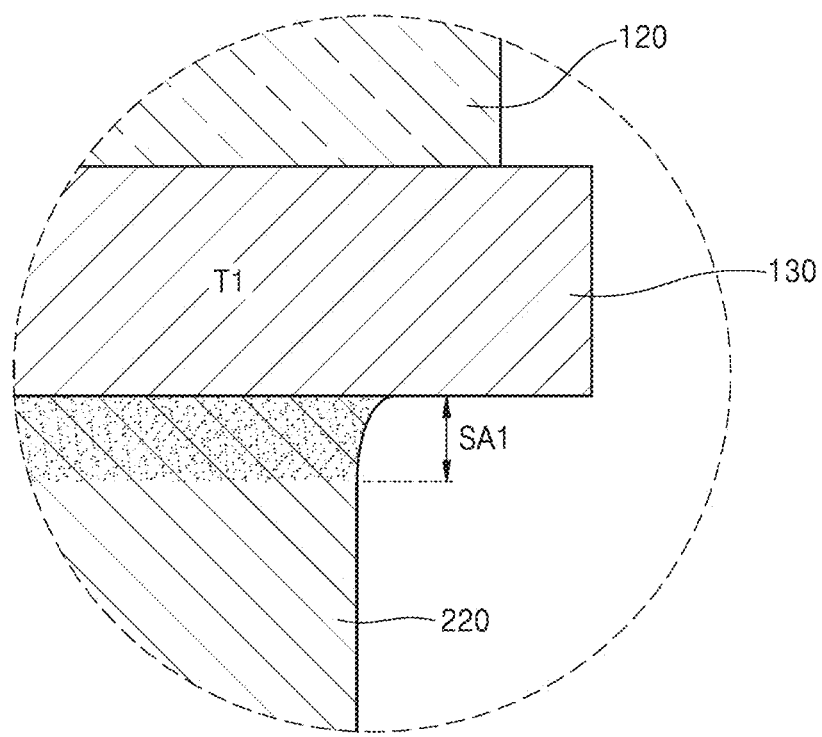
FIGS. 4 and 5 are enlarged cross-sectional views illustrating portion A of FIG. 3 according to a temperature change.
Figure 5:
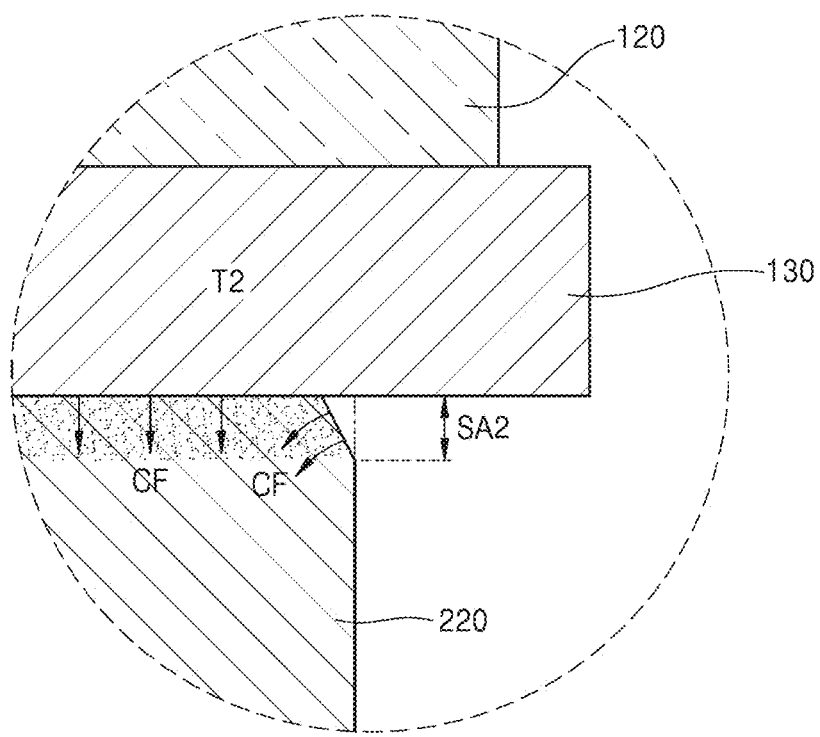

FIG. 3 illustrates the sample analyzing apparatus 100 to which the pipette tip 200 is attached. FIGS. 4 and 5 are enlarged cross-sectional views illustrating portion A of FIG. 3 according to a temperature change.

Referring to FIGS. 1 through 5, the pipette tip 200 may be coupled to the sample analyzing apparatus 100 during use of the sample analyzing apparatus 100, and may be separated therefrom after the use. The pipette tip 200 may include a body 210, into which an inspection fluid is sucked and which has a conical shape, and the flange end 220 mounted to the connector 130.

While the body 210 having a conical shape is illustrated in the drawing, the body 210 is not limited thereto, and may have other various shapes according to a shape of the collection grooves 12 of the cartridge 10 or according to a size of the sample analyzing apparatus 100.

An opening 211 may be formed in an end portion of the body 210, and an inspection fluid may be flown into or discharged through the opening 211. When a negative or positive pressure is formed in the pipette tip 200 by the driving unit 150, an inspection fluid in the collection grooves 12 may be sucked in or discharged.

The flange end 220 may be extended outward from the body 210 and bonded to the connector 130. As the flange end 220 is attached to the connector 130, sealing between the pipette tip 200 and the connector 130 may be maintained. The flange end 220 may increase an area of contact with the connector 130 to thereby increase the bonding force of the pipette tip 200 and stably attach the pipette tip 200 to the sample analyzing apparatus 100.

The flange end 220 of the pipette tip 200 may be formed of a polymer material that is melted at a relatively low temperature. For example, the pipette tip 200 may be formed of a polymer material melted at a temperature lower than 100 degrees Celsius.

Referring to FIG. 4, when the pipette tip 200 is attached to the connector 130 set to the first temperature T1, the flange end 220 is pulled outward on the surface that is in contact with the pipette tip 200. An upper surface of the flange end 220 is slightly melted to form a bonding area SA1. Here, a bonding surface of the connector 130 forms a certain bonding force with the bonding area SA1 of the pipette tip 200.

Referring to FIG. 5, to remove the pipette tip 200, when the connector 130 is set to the second temperature T2, a volume of the pipette tip 200 in an area in which the pipette tip 200 is bonded to the connector 130 is contracted according to a rapid temperature drop. As the upper surface of the flange end 220 is contracted inwards from both ends of the flange end 220, the bonding force between the pipette tip 200 and the connector 130 is reduced.

In particular, an upper end of the flange end 220 is contracted downward, and thus, a coupling force between the upper surface of the flange end 220 and a surface of the connector 130 is reduced. A height of a bonding area SA2 of the flange end 220 is reduced by a contracting force CF. As the bonding force between the connector 130 and the pipette tip 200 has been reduced, the user may easily remove the pipette tip 200 from the connector 130.

At the third temperature T3 between the first temperature T1 and the second temperature T2, a positive or negative pressure is formed in an inner space of the pipette tip 200. That is, as the driving unit 150 is driven at the third temperature T3, the sample analyzing apparatus 100 may suck in or discharge an inspection fluid.

When the temperature of the connector 130 is the first temperature T1 or close to the first temperature T1, flowability in an area that is in contact with the connector 130 is high. Thus, when a positive or negative pressure is formed in the inner space of the pipette tip 200, sealing is not maintained and an inspection fluid may leak out.

In addition, when the temperature of the connector 130 is the second temperature T2 or close to the second temperature T2, the bonding force between the connector 130 and the pipette tip 200 is low. Accordingly, when a positive or negative pressure is formed in the inner space of the pipette tip 200, due to the internal pressure, the pipette tip 200 may be separated from the connector 130.

Therefore, in order for the pipette tip 200 to stably suck in or discharge an inspection fluid while maintaining sealing, the driving unit 150 of the sample analyzing apparatus 100 may be driven after the temperature controlling member 120 sets the connector 130 to the third temperature T3 which is a temperature between the first temperature T1 and the second temperature T2.

According to an embodiment, the third temperature T3 may be set to be closer to the first temperature T1 than to the second temperature T2. When a rather high level of negative or positive pressure is formed in the pipette tip 200, and the flange end 220 is set to a low temperature, the pipette tip 200 may be separated from the connector 130. However, when the flange end 220 is set to a rather high temperature, even when the flange end 220 has certain flowability, the pipette tip 200 is not separated due to the strong bonding force thereof. Accordingly, the third temperature T3, at which an inspection fluid is sucked in or discharged from the pipette tip 200, may be set to be slightly closer to the first temperature T1, at which the pipette tip 200 is attached, than to the second temperature T2, at which the pipette tip 200 is separated.

The pipette tip 200 may be formed of a low melting point polymer.

In an embodiment, the pipette tip 200 may be formed of polycaprolactone (PCL) resin.

As polycaprolactone is a thermoplastic polymer having a melting point of 60 degrees, the first temperature T1 is set to a temperature higher than 60 degrees, and when heat generated in the temperature controlling member 120 heats the connector 130 to 60 degrees or higher, the flange end 220 of the pipette tip 200 is melted, and the pipette tip 200 is attached to the connector 130, as illustrated in FIG. 4.

In addition, when a temperature of the pipette tip 200 formed of procaprolactone is decreased to approximately 10 degrees, polycaprolactone is hardened and contracted, and the bonding force between the connector 130 and the flange end 220 is reduced. As a result, the pipette tip 200 may be separated from the connector 130.

When the pipette tip 200 formed of polycaprolactone is lowered to the third temperature T3, which is a temperature between the first temperature T1 and the second temperature T2, specifically, to about 40 degrees, the flange end 220 of the pipette tip 200 is slightly hardened, but sealing between the flange end 220 and the connector 130 is maintained, and a significant level of bonding force is obtained.

Here, even when the driving unit 150 is driven and a negative or positive pressure is set inside the pipette tip 200, the pipette tip 200 is not separated from the connector 130 and may suck or discharge an inspection fluid.

According to another embodiment, the pipette tip 200 may be formed of polytetramethylene oxide (PMTO). According to another embodiment, the pipette tip 200 may be formed of polyethylene oxide (PEG).

Figure 6:
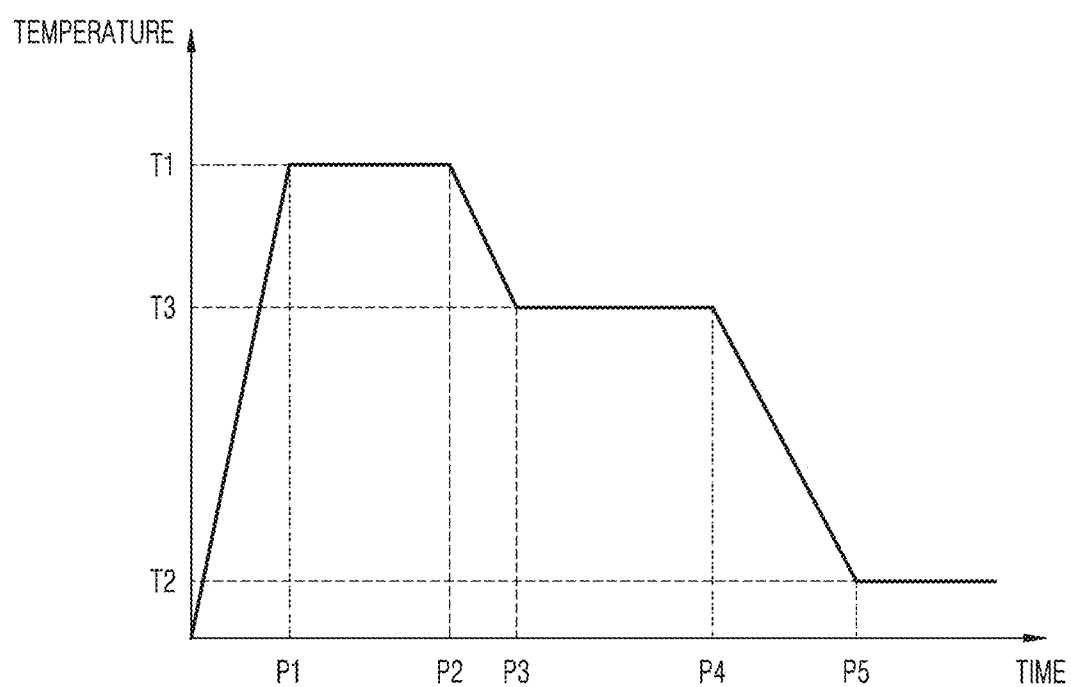
FIG. 6 is a graph showing a temperature control by a controller of FIG. 1.
Figure 7:
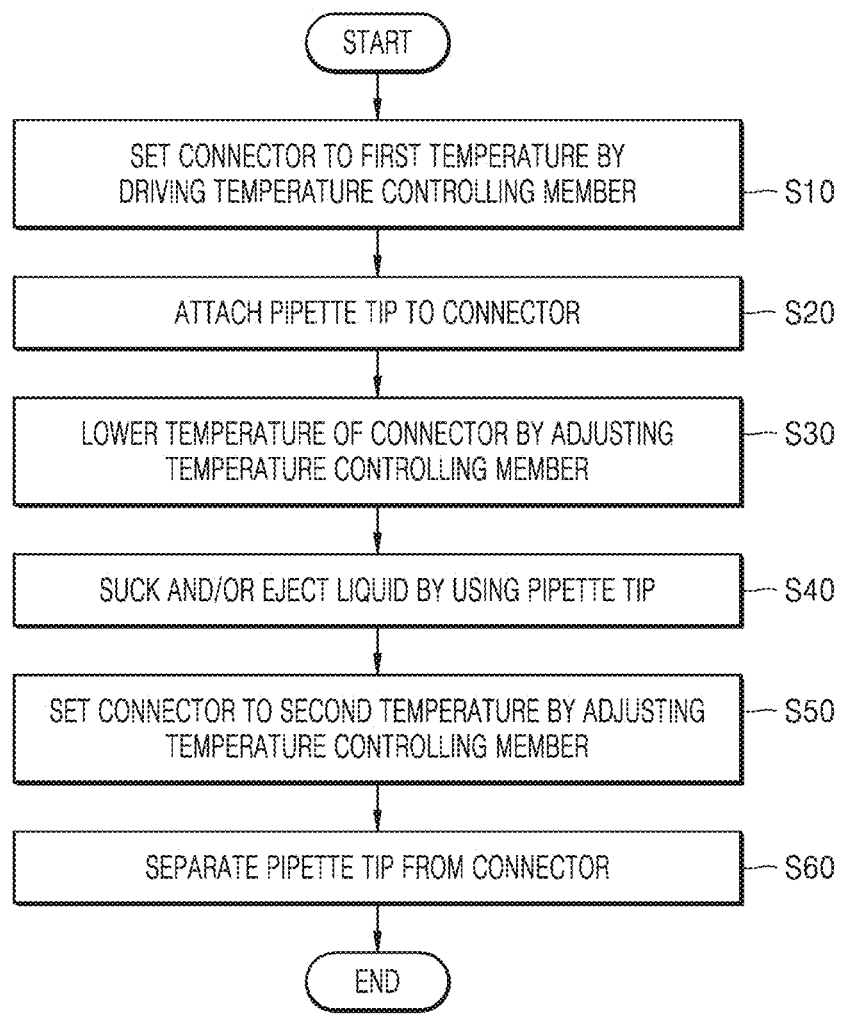
FIG. 7 is a flowchart of a sample analyzing method according to another embodiment of the present disclosure.

FIG. 6 is a graph showing temperature control by the controller 160 of FIG. 1, and FIG. 7 is a flowchart of a sample analyzing method according to another embodiment of the present disclosure.

Referring to FIGS. 6 and 7, the controller 160 may control an amount of heat generation or an amount of cooling of the temperature controlling member 120 while driving the sample analyzing apparatus 100.

The sample analyzing method may include setting a connector to a first temperature T1 by driving a temperature controlling member (S10), attaching a pipette tip to the connector (S20), lowering a temperature of the connector by adjusting the temperature controlling member (S30), sucking and/or ejecting a liquid by using the pipette tip (S40), setting the connector to a second temperature (T2) by adjusting the temperature controlling member (S50), and separating the pipette tip from the connector (S60).

In the setting of the connector to the first temperature (T1) by driving the temperature controlling member (S10), the temperature of the connector 130 is set to the first temperature T1 that is higher than the melting point of the pipette tip 200. When a signal for applying a current is generated by the controller 160, the temperature controlling member 120 increases the temperature of the connector 130 to at least the first temperature T1. Referring to FIG. 6, as the temperature controlling member 120 is driven, the connector 130 is set to the first temperature T1 at a time P1.

In the attaching of the pipette tip to the connector (S20), the pipette tip 200 is coupled to the sample analyzing apparatus 100. The flange end 220 of the pipette tip 200 is attached to the connector 130 while the sample analyzing apparatus 100 100 is aligned above the pipette tip 200. The flange end 220 is attached to the connector 130 and forms a certain bonding force. Referring to FIG. 6, the pipette tip 200 is attached to the connector 130 between the time P1 and a time P2.

In the lowering of the temperature of the connector by adjusting the temperature controlling member (S30), the sealing of the pipette tip 200 and the connector 130 is maintained and a state in which they have a certain bonding force is set. As the temperature drops from the time P2 to a time P3 in FIG. 6, the temperature of the connector 130 is set to the third temperature T3.

That is, the controller 160 controls the temperature controlling member 120 to absorb heat to lower the temperature of the connector 130 and set the same to the third temperature T3. For example, the controller 160 may change a direction of direct current power to start a cooling function in the temperature controlling member 120 which is a thermoelectric element.

In the sucking and/or ejecting of a liquid by using the pipette tip (S40), the driving unit 150 may be driven to suck in or discharge an inspection fluid by using the pipette tip 200. The driving unit 150 is driven by the controller 160, and a negative or positive pressure is formed in the inner space of the pipette tip 200.

When the driving unit 150 is driven, a negative pressure is first formed in the pipette tip 200, and the inspection fluid flows into the inner space through the opening of the pipette tip 200. Thereafter, the driving unit 150 is driven to discharge the inspection fluid to generate a positive pressure in the pipette tip 200, and the inspection fluid may be discharged through the opening of the pipette tip 200. Referring to FIG. 6, the sample analyzing apparatus 100 may pipette a sample from the time P3 to a time P4.

In the setting of the connector to the second temperature by adjusting the temperature controlling member (S40), since pipetting is completed, the temperature of the connector 130 is lowered to remove the pipette tip 200. As described above, when the temperature is lowered, the bonding force between the pipette tip 200 and the connector 130 is reduced due to the contraction of the pipette tip 200. The controller 160 drives the temperature controlling member 120 to lower the temperature of the connector 130 to the second temperature T2. Referring to FIG. 6, from the time P4 to a time P5, the temperature controlling member 120 absorbs heat and thus the temperature of the connector 130 is lowered to the second temperature T2, and the bonding force between the connector 130 and the pipette tip 200 is reduced.

In the separating of the pipette tip from the connector (S60), the pipette tip 200 is separated from the connector 130. As the bonding force between the pipette tip 200 and the connector 130 is very small, the user may easily separate the pipette tip 200.

A pipette tip was manufactured using polycaprolactone, and the bonding force of the pipette tip was measured according to temperature. An outer diameter of an end of a flange end of the pipette tip was set to 11.8 mm, an inner diameter thereof to 6.8 mm, and a thickness thereof to 1.5 mm.

The pipette tip was attached to a connector by setting a temperature of the connector to 70 degrees, and the bonding force between the pipette tip and the connector was measured while lowering the temperature of the connector. The bonding force was measured by a weight required to separate the pipette tip from the connector. The weight was measured by using an electronic scale at a time when the pipette tip was separated from the connector.

The bonding force of the pipette tip 200 measured according to a change in the temperature of the connector 130 that is in contact with the pipette tip 200 is as shown in Table 1 below.

TABLE 1

| Temperature (Temp, ° C.) | Bonding force (g) |
| --- | --- |
| 50 | 1700 |
| 40 | 506 |
| 30 | 317 |
| 20 | 42 |

Referring to Table 1, when the temperature of the connector is 50 degrees, the pipette tip and the connector still maintain a strong bonding force. Here, even if the driving unit is driven to set a positive or negative pressure inside the pipette tip, a pipetting function the pipette tip may be stably performed while maintaining a sealed state.

According to the sample analyzing apparatus and the sample analyzing method, according to an embodiment of the present disclosure, a pipette tip may be easily and quickly attached and detached. The pipette tip may be formed of a polymer having a relatively low melting temperature, and by controlling a temperature of a connector that contacts the pipette tip, the pipette tip may be attached to or detached from the sample analyzing apparatus. When a controller sets a temperature of the connector to a melting point or higher, the pipette tip is easily attached to the connector. Next, when the controller lowers the temperature of the connector, a bonding force between the connector and the pipette tip is reduced, thereby allowing to easily and neatly removing the pipette tip.

According to the sample analyzing apparatus and the sample analyzing method, according to an embodiment of the present disclosure, an inspection fluid may be stably sucked and ejected. Even when the temperature of the connector is lowered, as the bonding force between the pipette tip and the connector is set to a certain level or higher, despite a positive or negative pressure formed in the pipette tip, sealing may be maintained and thus pipetting may be performed stably.

As described above, the present disclosure is described with reference to the embodiments shown in the drawings, but this is merely an example, and it will be understood by those of ordinary skill in the art that various changes and other equivalent embodiments may be made therein. Therefore, the true technical scope of the present disclosure should be determined by the technical spirit of the appended claims.

INDUSTRIAL APPLICABILITY

The present disclosure relates to a sample analyzing apparatus and a sample analyzing method, and more particularly, the sample analyzing apparatus and the sample analyzing method may be used in an apparatus and system including a pipette to analyze an industrially used analysis object and in a method of analyzing an analysis object by using a pipette.

The invention claimed is:
1. A sample analyzing apparatus comprising:
a base;
a connector arranged at an end of the base;

a temperature controlling member mounted on the base and configured to adjust a temperature of the connector; and a controller configured to adjust heat generation of the temperature controlling member to adjust a bonding force of a pipette tip attached to a surface of the connector, wherein the temperature controlling member is configured to increase the temperature of the connector to a preset first temperature or higher to attach the pipette tip to the connector, and lower the temperature of the connector to a preset second temperature which is lower than the first temperature to separate the pipette tip from the connector.

2. The sample analyzing apparatus of claim 1, further comprising a driver connected to the base and configured to form a positive or negative pressure in the pipette tip in response to the temperature controlling member setting the connector to a temperature between the preset first temperature and the preset second temperature.

3. The sample analyzing apparatus of claim 1, wherein the pipette tip comprises a low melting point polymer including at least one of polycaprolactone (PLC), polytetramethylene oxide (PMTO), or polyethylene oxide (PEG).

4. The sample analyzing apparatus of claim 1, wherein the temperature controlling member is configured to lower the temperature of the connector in response to a polarity of electricity applied by the controller being converted.

* * * * *